United States Patent [19]

Gras et al.

[11] Patent Number: 4,970,306

[45] Date of Patent: Nov. 13, 1990

[54] TRANS-CYCLOHEXANE-1,4-DIISOCYA-NATE WHICH IS COMPLETELY OR PARTIALLY BLOCKED WITH EPSILON-CAPROLACTAM: AND THE MANUFACTURE AND USE OF THE SAME

[75] Inventors: Rainer Gras, Bochum; Elmar Wolf, Recklinghausen, both of Fed. Rep. of Germany

[73] Assignee: Huls Aktiengesellschaft, Marl, Fed. Rep. of Germany

[21] Appl. No.: 282,858

[22] Filed: Dec. 9, 1988

Related U.S. Application Data

[63] Continuation of Ser. No. 915,001, Oct. 3, 1986, abandoned.

[30] Foreign Application Priority Data

Oct. 9, 1985 [DE] Fed. Rep. of Germany ....... 3536017

[51] Int. Cl.$^5$ .................. C07D 403/12; C07D 222/14
[52] U.S. Cl. .................................... 540/525; 540/529; 564/57
[58] Field of Search .................. 540/525, 529; 564/57

[56] References Cited

U.S. PATENT DOCUMENTS

| 2,698,845 | 1/1955 | Maskin | 540/529 |
| 3,822,240 | 7/1974 | Schmitt | 528/45 |
| 4,203,916 | 5/1980 | Zengel | 564/57 |
| 4,313,876 | 2/1982 | Gras | 540/525 |

FOREIGN PATENT DOCUMENTS 3018198 11/1981 Fed. Rep. of Germany .

OTHER PUBLICATIONS

"Kunststoff Handbuch 7, Polyurethanes", Hanser Publications 1983, p. 69.

Primary Examiner—Patricia Short
Attorney, Agent, or Firm—Oblon, Spivak, McClelland, Maier & Neustadt

[57] ABSTRACT

The invention relates to trans-cyclohexane-1,4-diisocyanate which is completely or partially blocked with epsilon-caprolactam and a method of manufacturing the same wherein 1 mole trans-cyclohexane-1,4-diisocyanate is reacted with 1 to 2 moles epsilon-caprolactam, without or with the presence of solvents. These blocked diisocyanates are used for polyurethane powders.

4 Claims, No Drawings

TRANS-CYCLOHEXANE-1,4-DIISOCYANATE WHICH IS COMPLETELY OR PARTIALLY BLOCKED WITH EPSILON-CAPROLACTAM: AND THE MANUFACTURE AND USE OF THE SAME

This application is a Continuation of application Ser. No. 915,001, filed on Oct. 3, 1986, now abandoned.

BACKGROUND OF THE INVENTION

1. Field of the Invention:

The invention relates to a new blocked diisocyanate, a method of manufacturing the diisocyanate, and use of the diisocyanate for powder coating compositions.

2. Discussion of the Background:

All aliphatic diisocyanates blocked with epsiloncaprolactam are either highly viscous or have a low melting point. Therefore they are not candidates for the manufacture of polyurethane (hereafter referred to as "PUR") powders.

The only economically important blocked diisocyanates for producing weather-resistant PUR powder coatings are epsilon-caprolactam adducts of isophoronediisocyanate (IPDI). Epsilon-caprolactam blocked IPDI melts at 53–55° C. This low melting temperature results in caking of the powder when stored. To increase the melting point, IPDI is subjected to chain lengthening with a polyol (NCO:OH =2:1) prior to the blocking with epsiloncaprolactam. In Ger. OS 21 05 777, polyols such as 1, 1,1,-tris(hydroxymethyl) propane; 2,2,4-trimethyl-hexanediol; and diethylene glycol are mentioned as chain lengthening agents for IPDI. In Ger. OS 25 42 191, mixtures of di- and trifunctional polyols are mentioned as lengthening agents and in Ger. OS 31 43 060 aliphatic diamines are employed. Ger. OS 27 35 497 and OS 28 42 641 describe reactive PUR powders characterized by containing an epsilon-caprolactam blocked isocyanate-group-containing IPDI adduct as a hardener. Because IPDI in the above-mentioned PUR powders is subjected to molecular augmentation prior to the blocking, resulting in "elimination" of NCO groups, the PUR powder hardener produced therefrom has a relatively low NCO content of 9 to at most 16 wt. %.

There continues to be a need for a completely or only partially caprolactam blocked aliphatic or cycloaliphatic diisocyanate with a high NCO content, which displays a high melting point, satisfactory storage stability, and good use properties, without molecular augmentation, while completely avoiding the disadvantages of customary blocked non-chain-lengthened diisocyanates as hardeners in powder coatings.

SUMMARY OF THE INVENTION

Accordingly, one object of the present invention is to provide completely or partially blocked diisocyanate which avoids the disadvantages of prior art blocked non-chain-lengthened diisocyanates.

It is a further object of the invention to provide completely or partially blocked diisocyanates for use as hardeners in powder coatings.

These objects and other objects of the invention which will become apparent from the following specification have been achieved by the method and compounds of the present invention.

It has been discovered, in connection with the invention, that the completely or only partially blocked diisocyanate prepared by epsilon-caprolactam blocking of trans-cyclohexane-1,4-diisocyanate results in hardening in a mixture with polyols at temperatures 10 to 20° C. lower than is the case with, for example, the corresponding epsilon-caprolactam blocked 1,6-hexanediisocyanate with the same polyols.

DETAILED DESCRIPTION OF THE PREFERRED EMBODIMENTS

This outcome is surprising and at the same time very welcome, to one skilled in the art. It is surprising because the exact opposite would be expected. It is a well known doctrine that aliphatically bound NCO groups are more reactive toward polyols than cycloaliphatically bound NCO groups. The fact that for certain blocked NCO groups the reactivities toward polyols are reversed could not have been anticipated.

Accordingly, the present invention includes completely or partially epsilon-caprolactam blocked trans-cyclohexane-1,4-diisocyanates.

The inventive compounds melt at about 100–210° C, depending on their content of free NCO groups. Their content of free NCO groups is from 15.0 to 0.1 wt% and their content of blocked NCO groups is 15 to 22 wt %.

The present invention further includes a method of manufacturing the inventive compounds wherein 1 mole of trans-cyclohexane-1,4-diisocyanate is reacted with 1 to 3 moles of epsilon-caprolactam. The reaction may be carried out with or without a solvent. If carried out without a solvent, the diisocyanate is heated to 120140° C. and epsilon-caprolactam is added gradually such that the temperature of the reaction mixture does not exceed 170° C. After completion of the addition of the blocking agent, the reaction mixture is maintained in the molten state to allow the reaction to go to completion with all the epsilon-caprolactam being converted. The course of the reaction is monitored by determining the NCO content in the reaction mixture. The blocking reaction can also be carried out in solvents, as mentioned above. This use of a solvent is advantageously employed if the melting point of the reaction product exceeds 170° C.

Candidates for use as solvents in this reaction are obviously limited to solvents which do not react with isocyanates, such as ketones (e.g., acetone, methyl ethyl ketone, methyl isobutyl ketone, cyclohexanone, cyclopentanone, etc.); aromatics (e.g., toluene, xylene, and nitrobenzene); cyclic ethers (e.g., tetrahydrofuran and dioxane); aprotic solvents (e.g., dimethylformamide, dimethylacetamide, and dimethylsulfoxide); etc.

The present invention also includes the use of the inventive compounds as hardeners for multifunctional compounds having Zerevitinov-reactive hydrogen atoms. In combination with compounds having such Zerevitinovreactive H atoms, the products of the inventive process form systems which are hardenable at temperatures above 120° C, preferably 150–170° C., to form multivalent plastics. The most important area of application for the compounds of the present invention is their use as binders for light-stable PUR powder coatings.

Other features of the invention will become apparent in the course of the following descriptions of exemplary embodiments which are given for illustration of the invention and are not intended to be limiting thereof.

EXAMPLES

The formulation of exemplary heat-hardenable powder compositions in which the blocked diisocyanate of the present invention is employed is as follows (amounts given are parts by weight):
(a) OH-group-containing polyester 100
(b) Blocked trans-cyclohexane 1,4-diisocyanate 10-90
(c) Pigments 0-120
(d) Customary fillers 1-200
(e) Catalyst 0-5
(f) Vehicle 0.1-5

In principle, compound (a) may be any polymer containing more than 2 OH groups and melting at at least 70° C. Examples are polyetherpolyols, polyesteramidepolyols, PUR polyols, polyesterpolyols, hydroxylated acrylic resins, etc., with their OH groups available for crosslinking with the inventive blocked trans-cyclohexane-1,4-diisocyanate. Particularly preferred among the multitudinous possibilities for OH-containing polymers within the scope of the invention are polyesterpolyols. Such polyesterpolyols must have a molecular weight between 1,000 and 10,000, preferably 1,500-5,000, and must have an OH number of 10 to 300, preferably 20 to 200. Such polyesterpolyols are described in, for example, Ger. OS 19 57 483, OS 25 42 191, OS 30 04 876, and OS 31 43 060.

In order to increase the hardening rate of the heat-hardenable compositions, catalysts may be added, for example organotin compounds (such as dibutyltin dilaurate, stannous octanoate dibutyltin maleate, etc.). The amount of catalyst added is 0.1-5 wt % of the weight of the hydroxyl-group-containing polymer. The coatings prepared from the compounds of the present invention distinguish themselves by having outstanding weather resistance and very good colorfastness. Commonly used vehicles are described in, for example, Ger. OS 33 12 028 (see page 6, line 23 and page 7, line 12).

Suitable pigments are, for example, titanium dioxide and dyes or the like. Particularly good candidates for filler materials are barium sulfate and chalk.

A. Preparation of the Inventive Compounds

Example A1

197.8 parts by weight epsilon-caprolactam were added portionwise to 166 parts by weight of transcyclohexane-1,4diisocyanate at 120° C. such that the temperature of the reaction mixture did not rise above 140° C. After completion of the addition of the epsilon-caprolactam, the reaction mixture was heated an additional 2 hr at 130° C. The resulting reaction product melted in the range 123-127° C, and had a content of blocked NCO of 19.7 wt. % and a content of free NCO of 2.8 wt. %.

Example A2

226 parts by weight epsilon-caprolactam were added to 166 parts by weight trans-cyclohexane1,4-diisocyanate dissolved in 500 parts by weight xylene, at 100° C. The mixture was heated under reflux until the NCO content of the reaction solution was 0.3 wt. %. Upon cooling, the reaction product crystallized out and was then dried 3 hr in a vacuum drying cabinet at 80° C. and 12 mbar.

The resulting reaction product melted in the range 210-213° C. with decomposition, and had a content of blocked NCO of 21.0 wt. % and a content of free NCO of 0.4 wt. %.

Example A3

Comparative reaction of the inventive compounds with epsilon-caprolactam blocked 1,6-hexanediisocyanate:

The epsilon-caprolactam blocked trans-cyclohexane1,4-diisocyanate described in Example A2 and epsiloncaprolactam blocked 1,6-hexanediisocyanate were each mixed in equivalent ratios with the hydroxy ester described in Example B1. The mixtures were finely comminuted and were kneaded at 160, 170, and 180° C. in a kneading chamber (see Table 1 below). The kneading resistance was monitored as a function of time. As the reaction proceeded, the resistance in the composition increased. With crosslinking, the kneading resistance rose sharply and then soon dropped sharply. The crosslinked product crumbled, was broken up into small particles, and accordingly showed only minimal resistance.

TABLE 1

| Composition of the hardener/resin/mixture | Elapsed time before crosslinking, at various temperatures | | |
|---|---|---|---|
| | 160° C. | 170° C. | 180° C. |
| Epsilon-caprolactam and trans-cyclohexane-1,4-diisocyanate/Hydroxyester of Example B1 | 29' | 16' | 9' |
| Epsilon-caprolactam and 1,6-hexanediisocyanate/Hydroxyester of Example B1 | 45' | 26' | 14' |

B. Polyol Components

General Preparation Method:

The starting compounds: terephthalic acid, dimethyl terephthalate, 1,6-hexanediol, neopentyl glycol, 1,4-bis(hydroxymethyl)cyclohexane, and 1,1,1tri(hydroxymethyl)propane, were charged into a reactor and heated with the aid of an oil bath. After most of the material had melted, 0.05 wt. % di-n-butyltin oxide was added as a catalyst. The first methanol cleavage occurred at about 170° C. The temperature was increased over 6-8 hr to 220-230° C., and the reaction was carried out to completion over an additional 12-15 hr. The polyester was cooled to 200° C., and volatile materials were thoroughly removed by application of a vacuum (1 Torr) for 30-45 min. During the entire period of the reaction, the bottom product was stirred and a slight stream of nitrogen was passed through the reaction mixture.

Table 2 gives the compositions of different polyesters and characteristic associated physical and chemical data.

TABLE 2

| Example No. | Starting Components | | | | | | Chemical and physical characterizing data | | | | |
|---|---|---|---|---|---|---|---|---|---|---|---|
| | Terephthalic acid | Dimethyl terephthalate | 1,6-hexanediol | Neopentyl glycol | 1,4-bis(hydroxymethyl)cyclohexane | 1,1,1-tri(hydroxymethyl)propane | OH number mg KOH/g | Acid number, mg KOH/g | Melting Point °C. | Glass transition temperature, °C. | Viscosity 160 mPa- |
| B1 | 10 | 10 | 6.25 | 10.5 | 2 | 2.9 | 55-60 | 3-4 | ca. 75 | ca. 50 | 25 |
| B2 | Crylcoat ® 280M polyester (supplied by the firm UCB-Belgien) | | | | | | 50 | <10 | 100 ± 8 | 55 ± 8 | 19 |

TABLE 2-continued

| Example No. | Starting Components | | | | | | Chemical and physical characterizing data | | | | |
|---|---|---|---|---|---|---|---|---|---|---|---|
| | Terephthalic acid | Dimethyl terephthalate | 1,6-hexanediol | Neopentyl glycol | 1,4-bis (hydroxymethyl) cyclohexane | 1,1,1-tri (hydroxymethyl) propane | OH number mg KOH/g | Acid number, mg KOH/g | Melting Point °C. | Glass transition temperature, °C. | Viscosity 160 mPa- |
| B3 | 12 | 12 | 8 | 10.5 | 4.5 | 2.9 | 44–48 | 3–4 | ca. 75 | ca. 50 | 25 |

C. Polyurethane Powder Enamels

General Method of Preparation:

The granulated products, the crosslinking agent, polyester, vehicle (the latter mixed in a master batch with the polyester), and possibly a white pigment and-/or fillers, were mixed internally in an edge mill and then homogenized in an extruder at 80–110° C. After cooling, the extrudate was broken up and ground to a particle size of less than or equal to 100 microns, in a pinned disc mill. The resulting powder was applied to a degreased, possibly pretreated, iron or steel plate, using an electrostatic powder spray apparatus at 60 kV, and was baked in a recirculating drying cabinet at temperatures between 160 and 200° C.

To prepare the master batch of the vehicle in the resin, 10 wt. % of the vehicle (a commercially available copolymer of butyl acrylate and 2-ethylhexyl acrylate) was homogenized in the given polyester in the molten state. The homogenizate was solidified and comminuted.

Example C1

Pigmented Enamel:

A pigmented enamel with the following formula was prepared according to the above method, applied, and baked at 160–200° C. Amounts given are in parts by weight.

Polyester from Example B1: 449.6
Crosslinking agent from Example A1: 100.4
White (TiO$_2$) pigment: 400.0
Vehicle, in master batch: 50.0

TABLE 3

| Baking conditions Time (min.)/ Temp. (°C.) | Results for Example C1: Mechanical characterizing data | | | | | | |
|---|---|---|---|---|---|---|---|
| | Coating thickness, microns | Koenig hardness, sec. (DIN 53 157) | Buchholz hardness (DIN 53 153) | Erichsen penetration test parameter, mm (DIN 53 156) | Grid cutting test parameter (DIN 53 151) | Impact reverse, grammeters | Gardner gloss index (ASTM-D 523) |
| 6/200 | 70–80 | 172 | 100 | 9.7–10 | 0 | 806 | 82 |
| 8/200 | 60–80 | 172 | 100 | 9.8–>10 | 0 | >944 | 78 |
| 10/200 | 80–90 | 172 | 100 | >10 | 0 | >944 | 80 |
| 15/180 | 60–80 | 170 | 100 | 9.6–9.8 | 0 | >944 | 77 |
| 20/180 | 60–70 | 173 | 100 | 9.9–10 | 0 | >944 | 79 |
| 25/180 | 70–85 | 171 | 100 | >10 | 0 | >944 | 78 |
| 20/170 | 70–80 | 172 | 100 | 9.5–9.8 | 0 | 691 | 79 |
| 25/170 | 60–85 | 170 | 100 | 9.7–10 | 0 | >944 | 77 |
| 30/160 | 70–80 | 172 | 100 | 6.5–6.9 | 0 | 345 | 78 |
| 35/160 | 60–70 | 174 | 100 | 7.1–7.5 | 0 | 462 | 77 |

Example C2

Pigmented enamel:

A pigmented enamel with the following formula was prepared according to the general method above, applied, and baked at 160–200° C. Amounts given are in parts by weight.

Polyester from Example B2: 455.4
Crosslinking agent from Example A1: 94.6
White (TiO$_2$) pigment: 400.0
Vehicle, in master batch: 50.0

TABLE 4

| Baking conditions Time (min.)/ Temp. (°C.) | Results for Example C2: Mechanical characterizing data | | | | | | |
|---|---|---|---|---|---|---|---|
| | Coating thickness, microns | Koenig hardness, sec. (DIN 53 157) | Buchholz hardness (DIN 53 153) | Erichsen penetration test parameter, mm (DIN 53 156) | Grid cutting test parameter (DIN 53 151) | Impact reverse, grammeters | Gardner gloss index (ASTM-D 523) |
| 6/200 | 60–70 | 179 | 100 | 9.5–9.7 | 0 | >944 | 81 |
| 8/200 | 60–70 | 183 | 111 | >10 | 0 | >944 | 80 |
| 10/200 | 70–80 | 180 | 100 | >10 | 0 | >944 | 78 |
| 15/180 | 60–80 | 184 | 100 | >10 | 0 | >944 | 77 |
| 20/180 | 60–85 | 184 | 100 | >10 | 0 | >944 | 80 |
| 25/180 | 60 | 179 | 100 | >10 | 0 | >944 | 78 |
| 20/170 | 70–80 | 182 | 100 | 9.1–9.5 | 0 | 806 | 79 |
| 25/170 | 60–75 | 185 | 100 | 9.7–10 | 0 | >944 | 77 |
| 30/160 | 70–80 | 180 | 100 | 6.4–7.1 | 0 | 462 | 80 |

TABLE 4-continued

| | Results for Example C2: | | | | | | |
|---|---|---|---|---|---|---|---|
| Baking | Mechanical characterizing data | | | | | | |
| conditions Time (min.)/ Temp. (°C.) | Coating thickness, microns | Koenig hardness, sec. (DIN 53 157) | Buchholz hardness (DIN 53 153) | Erichsen penetration test parameter, mm (DIN 53 156) | Grid cutting test parameter (DIN 53 151) | Impact reverse, grammeters | Gardner gloss index (ASTM-D 523) |
| 35/160 | 60–85 | 183 | 100 | 6.8–7.5 | 0 | 576 | 79 |

Example C3

Pigmented Enamel:

A pigmented enamel with the following formula was prepared according to the general method above, applied, and baked at 160–200° C. Amounts given are in parts by weight.

Polyester from Example B1: 469.6
Crosslinking agent from Example A2: 80.4
White (TiO₂) pigment: 400.0
Vehicle, in master batch: 50.0

TABLE 5

| | Results for Example C3: | | | | | | |
|---|---|---|---|---|---|---|---|
| Baking | Mechanical characterizing data | | | | | | |
| conditions Time (min.)/ Temp. (°C.) | Coating thickness, microns | Koenig hardness, sec. (DIN 53 157) | Buchholz hardness (DIN 53 153) | Erichsen penetration test parameter, mm (DIN 53 156) | Grid cutting test parameter (DIN 53 151) | Impact reverse, grammeters | Gardner gloss index (ASTM-D 523) |
| 6/200 | 60–80 | 179 | 100 | 9.1–9.4 | 0 | 806 | 80 |
| 8/200 | 70–85 | 175 | 100 | 9.7–10 | 0 | >944 | 77 |
| 10/200 | 60–70 | 174 | 111 | >10 | 0 | >944 | 79 |
| 15/180 | 60–70 | 176 | 100 | >10 | 0 | >944 | 79 |
| 20/180 | 60–70 | 172 | 100 | >10 | 0 | >944 | 78 |
| 25/180 | 70–80 | 173 | 100 | 9.8–10 | 0 | >944 | 81 |
| 20/170 | 70–80 | 174 | 100 | 8.9–9.5 | 0 | 691 | 78 |
| 25/170 | 65–80 | 175 | 100 | 9.7–10 | 0 | >944 | 78 |
| 30/160 | 70–80 | 171 | 100 | 6.2–6.8 | 0 | 345 | 76 |
| 35/160 | 60–75 | 173 | 100 | 7.2–7.5 | 0 | 576 | 79 |

Example C4:

Pigmented Enamel:

A pigmented enamel with the following formula was prepared according to the general method above, applied, and baked at 160–200° C. Amounts given are in parts by weight.

Polyester from Example B1: 443.9
Crosslinking agent from Example A2: 106.1
White (TiO₂) pigment: 400.0
Vehicle, in master batch: 50.0

TABLE 6

| | Results for Example C4: | | | | | | |
|---|---|---|---|---|---|---|---|
| Baking | Mechanical characterizing data | | | | | | |
| conditions Time (min.)/ Temp. (°C.) | Coating thickness, microns | Koenig hardness, sec. (DIN 53 157) | Buchholz hardness (DIN 53 153) | Erichsen penetration test parameter, mm (DIN 53 156) | Grid cutting test parameter (DIN 53 151) | Impact reverse, grammeters | Gardner gloss index (ASTM-D 523) |
| 6/200 | 80–90 | 183 | 100 | >10 | 0 | >944 | 80 |
| 8/200 | 70–90 | 180 | 111 | >10 | 0 | >944 | 81 |
| 10/200 | 80–95 | 186 | 125 | >10 | 0 | >944 | 83 |
| 15/180 | 80–90 | 182 | 125 | >10 | 0 | >944 | 83 |
| 20/180 | 80–90 | 183 | 111 | >10 | 0 | >944 | 81 |
| 25/180 | 75–85 | 179 | 111 | >10 | 0 | >944 | 82 |
| 20/170 | 70–90 | 177 | 100 | 9.4–>10 | 0 | >944 | 81 |
| 25/170 | 80–90 | 184 | 100 | 9.5–>10 | 0 | >944 | 83 |
| 30/160 | 80–90 | 182 | 100 | 5.9–6.5 | 0 | 230 | 81 |
| 35/160 | 90 | 189 | 111 | 6.5–7.1 | 0 | 462 | 82 |

Example C5:

Pigmented Enamel:

A pigmented enamel with the following formula was prepared according to the general method above, applied, and baked at 160–200° C. Amounts given are in parts by weight.

Polyester from Example B2: 449.8
Crosslinking agent from Example A2: 100.2
White (TiO2) pigment: 400.0
Vehicle, in master batch: 50.0

TABLE 7

| Baking conditions Time (min.)/ Temp. (°C.) | Coating thickness, microns | Koenig hardness, sec. (DIN 53 157) | Buchholz hardness (DIN 53 153) | Erichsen penetration test parameter, mm (DIN 53 156) | Grid cutting test parameter (DIN 53 151) | Impact reverse, grammeters | Gardner gloss index (ASTM-D 523) |
|---|---|---|---|---|---|---|---|
| 6/200 | 70–80 | 183 | 100 | 9.7–10 | 0 | >944 | 82 |
| 8/200 | 60–80 | 180 | 111 | >10 | 0 | >944 | 84 |
| 10/200 | 70–85 | 181 | 111 | >10 | 0 | >944 | 83 |
| 15/180 | 60–75 | 184 | 111 | 9.5–9.9 | 0 | >944 | 80 |
| 20/180 | 70–80 | 182 | 100 | 9.7–10 | 0 | >944 | 81 |
| 25/180 | 70–80 | 185 | 111 | >10 | 0 | >944 | 85 |
| 20/170 | 75–85 | 179 | 100 | 9.4–9.8 | 0 | 806 | 83 |
| 25/170 | 60–70 | 182 | 100 | 9.2–>10 | 0 | >944 | 85 |
| 30/160 | 60–80 | 183 | 100 | 5.7–6.2 | 0 | 115 | 84 |
| 35/160 | 70–85 | 180 | 111 | 6.3–6.8 | 0 | 576 | 82 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An epsilon-caprolactam-blocked transcyclohexane-1,4-diisocyanate compound having a melting point of about 100 to 210° C., comprising from 0.1 to 15 wt.% free isocyanate groups and from 15 to 22 wt.% isocyanate groups blocked with epsilon-caprolactam.

2. An epsilon-caprolactam blocked transcyclohexane-1,4-diisocyanate, obtained by reactign one equivalent of trans-cyclohexane-1,4-diisocyanate with from 1 to 2 of epsilon-caprolactam, said epsilon-caprolactam-blocked trans-cyclohexane-1,4-diisocyanate compound having a melting point of about 100 to 210° C., comprising from 0.1 to 15 wt.% free isocyanate groups, and from 15 to 22 wt.% isocyanate groups blocked with epsilon-caprolactam.

3. The epsilon-caprolactam blocked transcyclohexane-1,4diisocyanate of claim 2, wherein said trans-cyclohexane-1,4-diisocyanate is reacted with said epsilon-caprolactam in the presence of a solvent which does not react with isocyanates.

4. The epsilon-caprolactam blocked trancyclohexane-1,4-diisocyanate of claim 3, wherein said solvent is a ketone selected from a group consisting of acetone, methylethyl ketone, methylisobutyl ketone, cyclohexanone and cyclopentanone; or an aromatic selected from the group consisting of toluene, xylene and nitrobenzene; or a cyclic ether selected from the group consisting of tetrahydrofuran and dioxane; or an aprotic solvent selected from the group consisting of dimethylformamide, dimethylacetamide and dimethylsulfide.

* * * * *